Patented Feb. 13, 1945

2,369,196

UNITED STATES PATENT OFFICE 2,369,196

PRODUCTION OF PHENOLIC COMPOUNDS

Paul H. Williams, Berkeley, and Seaver A. Ballard and Theodore W. Evans, Oakland, Calif., assignors to Shell Development Company, San Francisco, Calif., a corporation of Delaware No Drawing. Application July 13, 1942, Serial No. 450,804

8 Claims. (Cl. 260—621)

This invention relates to a process for the non-catalytic pyrolysis of non-aromatic cyclic ketonic compounds to produce phenolic compounds containing the same number of nuclear carbon atoms. A preferred embodiment of the invention comprises the non-catalytic pyrolysis of 3,5,5-trimethyl cyclohexene-2-one (isophorone) to 3,5-dimethyl phenol (xylenol).

It is known that cyclic ketones may be transformed into phenols by the combined action of high temperature, pressure and catalysts (e. g., aluminum compounds). Such phenolic compounds, however, have never before been produced by the simple application of heat without increased pressure and in the total absence of catalyst from non-aromatic cyclic ketones containing the same number of nuclear carbon atoms and the literature contains various reports of unsuccessful attempts to effect this reaction (Ber. 27: 812 [1894]; Chem. Ztg. 47: 489 [1923]; J. A. C. S. 61:3359–60 [1939]).

It has now been found, however, according to the process of the present invention, that aromatic mono- and poly-hydroxy compounds may be produced by the non-catalytic pyrolysis of the corresponding ketones containing a cyclic non-aromatic nucleus of six carbon atoms. The reaction is effected in the vapor phase and below the temperature at which destruction of the nuclear carbon structure becomes excessive.

In the production of 3,5 xylenol from isophorone, for instance, the optimum temperature for the present process has been found to be in the range of about 640° C. to about 675° C. The procedure at this temperature produces yields of 25 to 39 per cent which vary roughly with the temperature and contact time or rate of flow of the vapor through the furnace. The greatest yield on these runs was obtained with a contact time of 2.3 seconds. A higher temperature and/or a longer contact time result in increased destruction of the carbon structure of the compound, producing toluene, carbon monoxide and other degradation products.

The essential apparatus for the process consists merely of a tube or reaction chamber in which the feed material is activated by the desired temperature. It should be constructed of material which will not catalyze the molecular degradation of the cyclic compound. For this purpose an aluminum-copper alloy vessel such as ambraloy or an ambraloy-lined stainless steel tube has been found quite satisfactory. The process may be carried out in batch, intermittent or continuous procedure. However, since it is generally desirable to maintain the gaseous ketone at the reaction temperature for only a short period of time, the process is consequently particularly adapted to a continuous flow. The feed material may be vaporized and/or pre-heated in a separate chamber or fore-section of the reaction tube and then passed into the zone of maximum temperature, or the liquid may be volatized in the same chamber in which the pyrolysis is effected.

The reaction tube or chamber may be packed or unpacked. The employment of a non-catalytic packing such as quartz chips, pumice, ceramic material, spun glass and the like serve to prevent hot spots in the furnace by more evenly distributing the heat, increasing the heated surface area, etc. Increased or reduced pressure may also be employed though neither is essential.

A diluent may also be used along with the reaction mixture for the purpose of equalizing zones of extreme temperature, promoting a more uniform reaction rate, restraining the amount of nuclear disintegration and otherwise improving the reaction. Such diluents as hydrogen, nitrogen, high boiling hydrocarbons and the like may be employed, singly or in combination, in amounts adapted to the particular feed material, the reaction time and temperature, etc. The gas issuing from the reaction zone may be allowed to condense, with or without the aid of a cooling system, or it may be immediately quenched as by directing it in concurrent flow through a plurality of small bore tubes, together with a cold liquid such as water, etc. For the quenching agent, instead of using a substance in which the phenolic product is sparingly soluble such as water, the gaseous reaction mixture may be simultaneously quenched and the product dissolved in a suitable solvent such as aqueous sodium hydroxide and the like. The exit material, of course, will also contain some substances which are normally gaseous at ordinary temperature and pressure, such as methane, hydrogen, etc.

The 3,5-dimethyl phenol, for example, will readily dissolve in sodium hydroxide solution (having a concentration of, say, from 1% to 25%), and other material present can be separated from the alkali by extracting with diethyl ether or another suitable solvent, such as other ethers, saturated hydrocarbons, petroleum ether, aromatic compounds and the like. The alkali phase then, on acidification with hydrochloric acid, separates into two layers. The upper layer, which comprises the dimethyl phenol, solidifies on standing; it may be further purified by recrystallization.

Although the phenolic compounds produced by the present process are obtained more readily from substances with the non-aromatic nucleus already containing one or more olefinic bonds, the starting material is not limited to such compounds. The reaction is also effected easily from compounds of the class described which contain a hydrogen atom attached to a saturated carbon atom which is adjacent to the carbonylic group, particularly so when the nucleus also contains a quaternary carbon atom. Among the many substances applicable to the process of the present invention, mention may be made of the following: isophorone, homo-isophorone, hydroxy isophorone, pulegone, isopulegone, carvenone, cyclohexanone, carbone, menthone, $\alpha,\gamma$-bis-[2-oxo-4-methyl-cyclohexyl]-propane, 2,7-diketo-1,2,3,4,5,-6,7,8-octohydro naphthalene, $\alpha$ keto-tetrahydro naphthalene, $\gamma$ dicarvelone, Bucco camphor and other diosphenols and the like, their analogues, homologues and suitable substituted derivatives. The methyl groups in isophorone and similar substances may be substituted by any alkyl radical such as ethyl, propyl, isopropyl, butyl, isobutyl, amyl, hexyl, heptyl, etc. The nucleus may also have unsaturated side chains as well as various other substituents such as hydroxy radicals, halogen atoms (as the vinyl type halides—i. e., the halide attached to an unsaturated carbon atom as in 2-chlor $\Delta$ 2-cyclohexenone) and the like. In general, the preferred temperature for the pyrolysis of this whole class of ketonic compounds is in the range of about 575° C. to about 750° C., although higher or lower temperatures may be employed, the contact time varying inversely with the temperature. Generally, this contact time should be less than about 30 seconds since an excessive residence time, other conditions being equal, will cause excessive nuclear degradation or disintegration, i. e., an excessive rupture of the carbon-to-carbon bonds in the nucleus of the non-aromatic cyclic ketonic material subjected to treatment. The preferred contact time, particularly when the non-catalytic reaction is effected in accordance with the process of the present invention at temperatures of from about 640° C. to about 675° C., is within the range of from about 2 seconds to about 3 seconds.

Various aspects of the invention may be illustrated by the following examples in which the pyrolysis tube was fabricated of ambraloy, 32 inches long and 14 mm. internal diameter with a heated length of 18 inches. The tube was heated in an ordinary laboratory gas-fired furnace and the apparatus flushed with nitrogen gas immediately prior to charging the feed in order to eliminate oxygen. The isophorone to be pyrolyzed was forced from a reservoir by means of nitrogen gas pressure through a rotameter and into a preheater maintained at a temperature somewhat above the boiling point of isophorone at atmospheric pressure. From the preheater, the vaporized isophorone was passed directly into the pyrolysis tube at approximately atmospheric pressure. The product was condensed by passage through a water cooled condenser and collected in an ice cooled flask. The gaseous product was then conducted through a wet meter for measuring its volume.

*Example I*

The pyrolysis tube was maintained at a temperature of 700°–704° C. and 276 g. (2 mols) of preheated isophorone were passed through at a rate of liquid flow of 2.5 cc./min., thereby giving a contact time of 3.5 seconds. 180 g. of liquid product and 83 g. of gaseous product of average molecular weight 25.(0) were obtained on condensation of the exit gas. The amount of isophorone unreacted was 15% and the yield of 3,5-xylenol was 25%.

*Example II*

The pyrolysis tube was maintained at a temperature of 668°–676° C. and 276 g. (2 mols) of isophorone were passed into the preheater, maintained at a temperature of 245°–250° C., at the rate of 3.1 cc./min. thereby giving a contact period in the pyrolysis chamber of 2.3 seconds. The products of the run consisted of 251 g. of condensate and 2.46 ft.³ of gaseous product of overage molecular weight 26.(3). The amount of isophorone unreacted was 32% and the yield of 3,5-xylenol was 39%.

An unidentified ketone of formula $C_9H_{14}O$ was also obtained in both cases.

All of the phenolic compounds produced by the present process are useful as solvents, disinfectants, intermediates for chemical synthesis, in synthetic resin or plastic production, as precursors of oxidation inhibitors, in ore flotation, as metallic cleaners, etc.

The 3,5-xylenol, for example, is particularly suited for employment in phenol-formaldehyde type resins as the formaldehyde may react with all three of the 2,4,6 positions of the aromatic nucleus and the alkyl radicals on the 3 and 5 positions increase the solubility of the resin in drying oils.

Various modifications of the process will be suggested to one skilled in the art which may be effected without departing from the scope of the invention as set out in the appended claims.

We claim as our invention:

1. A process for the continuous production of 3,5-dimethyl phenol which comprises continuously conveying isophorone in the vapor state, at substantially atmospheric pressure and in the absence of a catalyst, through a reaction zone packed with an inert non-catalytic material, maintaining the temperature within the reaction zone at between about 640° C. and about 675° C., conveying said isophorone vapors through said reaction zone at such a rate that the residence time therein is about 2.3 seconds, continuously withdrawing the vaporous reaction mixture thus formed from said reaction zone, quenching said reaction mixture with an aqueous sodium hydroxide solution substantially immediately after withdrawal from the reaction zone, and separating 3,5-dimethyl phenol from the reaction mixture.

2. A process for the continuous production of 3,5-dimethyl phenol which comprises continuously conveying isophorone in the vapor state, at substantially atmospheric pressure and in the absence of a catalyst, through an unpacked reaction zone, maintaining the temperature within the reaction zone at between about 640° C. and about 675° C., conveying said isophorone vapors through said reaction zone at such a rate that the residence time therein is between about 2 seconds and about 3 seconds, continuously withdrawing the vaporous reaction mixture thus formed from said reaction zone, quenching said reaction mixture substantially immediately after withdrawal from the reaction zone, and separating 3,5-dimethyl phenol from the reaction mixture.

3. A process for the production of 3,5-dimethyl phenol which comprises subjecting isophorone in the vapor state, in the absence of a catalyst, and at about atmospheric pressure, to a temperature of between about 640° C. and about 675° C. for a period of between about 2 seconds and about 3 seconds, thereby converting isophorone to 3,5-dimethyl phenol, quenching the reaction mixture thus formed, and separating the 3,5-dimethyl phenol from the reaction mixture thus obtained.

4. A process for the production of 3,5-dimethyl phenol which comprises subjecting isophorone in the vapor state, in the absence of a catalyst and at about atmospheric pressure, to a temperature of between about 640° C. and about 675° C. for a period of between about 2 seconds and about 3 seconds, and separating 3,5-dimethyl phenol from the reaction mixture thus formed.

5. A process for the production of 3,5-dimethyl phenol which comprises subjecting isophorone in the vapor state, in the absence of a catalyst and at about atmospheric pressure, to a temperature of between about 575° C. and about 750° C. for a period of time less than about 30 seconds, and separating the resulting dimethyl phenol from the reaction mixture.

6. A process for the production of 3,5-dimethyl phenol which comprises subjecting isophorone, in the vapor state and in the absence of a catalyst, to a temperature of between about 575° C. and about 750° C. for a period of time less than about 30 seconds, and separating the resulting dimethyl phenol from the reaction mixture.

7. A process for the production of a 3,5-dialkyl phenol which comprises subjecting a 3,5,5-trialkyl cyclohexene-2-one, in the vapor state and in the absence of a catalyst, to a temperature of between about 575° C. and about 750° C. for a period of time less than about 30 seconds, and separating the resulting 3,5-dialkyl phenol from the reaction mixture.

8. A process for the production of a 3,5-dialkyl phenol which comprises subjecting a 3,5,5-trialkyl mono-cyclo-aliphatic ketone having six carbon atoms in the ring, in the vapor state and in the absence of a catalyst, to a temperature of between about 575° C. and about 750° C. for a period of time less than about 30 seconds, and separating the resulting 3,5-dialkyl phenol from the reaction mixture.

PAUL H. WILLIAMS.
SEAVER A. BALLARD.
THEODORE W. EVANS.